United States Patent
Ishizaka (10) Patent No.: US 10,536,217 B2
(45) Date of Patent: Jan. 14, 2020

(54) OPTICAL TRANSMISSION MODULE AND CONTROL METHOD OF OPTICAL TRANSMISSION MODULE

(71) Applicant: Fujitsu Optical Components Limited, Kawasaki-shi, Kanagawa (JP)

(72) Inventor: Tetsuo Ishizaka, Inagi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/602,756

(22) Filed: May 23, 2017

(65) Prior Publication Data
US 2018/0006721 A1   Jan. 4, 2018

(30) Foreign Application Priority Data

Jun. 30, 2016 (JP) ................................. 2016-130746

(51) Int. Cl.
| | |
|---|---|
| *H04B 10/50* | (2013.01) |
| *H04B 10/079* | (2013.01) |
| *H04B 10/516* | (2013.01) |
| *H05B 37/02* | (2006.01) |

(52) U.S. Cl.
CPC ..... *H04B 10/07955* (2013.01); *H04B 10/502* (2013.01); *H04B 10/516* (2013.01); *H05B 37/0227* (2013.01); *H04B 10/50* (2013.01)

(58) Field of Classification Search
CPC ............ H04B 10/07955; H04B 10/502; H04B 10/516; H04B 10/50; H04B 10/58; H04B 10/564; H04B 10/0799; H05B 37/0227

USPC .................................... 398/25–38, 182–201
See application file for complete search history.

(56) References Cited

U.S. PATENT DOCUMENTS

| | | | | |
|---|---|---|---|---|
| 5,732,096 A | * | 3/1998 | Suzuki | H01S 5/06832 372/38.01 |
| 5,844,928 A | * | 12/1998 | Shastri | H01S 5/06804 372/34 |
| 5,978,393 A | * | 11/1999 | Feldman | H01S 5/0683 372/29.021 |
| 6,204,945 B1 | * | 3/2001 | Iwata | H04B 10/506 398/9 |
| 6,414,974 B1 | * | 7/2002 | Russell | H01S 5/0683 372/29.015 |

(Continued)

FOREIGN PATENT DOCUMENTS

JP   2007-103398   4/2007

*Primary Examiner* — Dibson J Sanchez
(74) *Attorney, Agent, or Firm* — Staas & Halsey LLP (57) ABSTRACT

An optical transmission module includes: a bias current drive circuit to drive a bias current of a light-emitting element, on a basis of an input bias current setting value; a modulation current drive circuit to drive a modulation current of the light-emitting element, on a basis of an input modulation current setting value; a light-receiving element to measure an optical output power of the light-emitting element; a determiner to determine whether a difference between a target value of the optical output power and the optical output power measured by the light-receiving element is equal to or more than a threshold; and a controller configured to perform a correction control to the bias current drive circuit so that the bias current is reduced in accordance with the difference, when it is determined that the difference is equal to or more than the threshold by the determiner.

6 Claims, 9 Drawing Sheets

(56) References Cited

U.S. PATENT DOCUMENTS

| | | | |
|---|---|---|---|
| 6,671,248 B2* | 12/2003 | Miyabata | G11B 7/0045 369/116 |
| 6,795,458 B2* | 9/2004 | Murata | H01S 5/042 372/26 |
| 6,819,480 B2* | 11/2004 | Altman | H04B 10/505 359/337.13 |
| 6,895,028 B2* | 5/2005 | Sugawara | H01S 5/06835 372/38.02 |
| 7,502,568 B1* | 3/2009 | Mohan | H04B 10/0799 398/195 |
| 7,630,651 B2* | 12/2009 | Shimizu | H04B 10/505 359/239 |
| 7,715,728 B2* | 5/2010 | Kijima | G02B 6/4201 398/182 |
| 8,861,559 B2* | 10/2014 | Tang | H01S 5/0683 372/26 |
| 2001/0005437 A1* | 6/2001 | Masuda | G02F 1/0123 385/2 |
| 2003/0118063 A1* | 6/2003 | Sugawara | H01S 5/06835 372/38.02 |
| 2003/0210914 A1* | 11/2003 | Khayim | H04B 10/505 398/197 |
| 2004/0032889 A1* | 2/2004 | Hidaka | H01S 5/0683 372/38.02 |
| 2004/0032890 A1* | 2/2004 | Murata | H01S 5/042 372/38.02 |
| 2004/0136422 A1* | 7/2004 | Mahowald | H04B 10/564 372/38.02 |
| 2004/0136720 A1* | 7/2004 | Mahowald | H04B 10/40 398/135 |
| 2004/0246460 A1* | 12/2004 | Auracher | H01S 5/06832 356/4.01 |
| 2004/0258112 A1* | 12/2004 | Furumiya | G11B 7/1263 372/38.01 |
| 2005/0078721 A1* | 4/2005 | Wu | H01S 5/0014 372/38.01 |
| 2005/0128555 A1* | 6/2005 | Jang | H04B 10/505 359/237 |
| 2005/0226292 A1* | 10/2005 | Nagai | H04B 10/29 372/38.02 |
| 2006/0114952 A1* | 6/2006 | Seo | H01S 5/0683 372/33 |
| 2006/0291511 A1* | 12/2006 | Lan | H01S 3/1312 372/38.01 |
| 2007/0071046 A1* | 3/2007 | Quek | H01S 5/06832 372/38.02 |
| 2007/0076771 A1 | 4/2007 | Fujimoto et al. | |
| 2007/0116076 A1* | 5/2007 | Wang | H01S 5/0683 372/38.07 |
| 2007/0133634 A1* | 6/2007 | Lee | H01S 5/06832 372/38.04 |
| 2007/0160095 A1* | 7/2007 | Kitagawa | H01S 5/0683 372/29.012 |
| 2007/0160374 A1* | 7/2007 | Matsui | H04B 10/504 398/195 |
| 2007/0248130 A1* | 10/2007 | Ishibashi | H01S 5/06832 372/38.07 |
| 2007/0253454 A1* | 11/2007 | Gustavson | H01S 5/06213 372/38.07 |
| 2008/0165813 A1* | 7/2008 | Miller | H01S 3/131 372/29.011 |
| 2008/0181272 A1* | 7/2008 | Miller | H01S 5/0683 372/38.01 |
| 2008/0212628 A1* | 9/2008 | Tanaka | H01S 5/06832 372/38.02 |
| 2009/0135868 A1* | 5/2009 | Ishibashi | H01S 5/06832 372/38.02 |
| 2009/0201956 A1* | 8/2009 | Kanesaka | H01S 5/0683 372/29.021 |
| 2009/0324252 A1* | 12/2009 | Nagayama | G02F 1/0123 398/183 |
| 2010/0322271 A1* | 12/2010 | Ichino | H01S 5/06804 372/26 |
| 2011/0085793 A1* | 4/2011 | Oomori | H04B 10/40 398/22 |
| 2012/0020381 A1* | 1/2012 | Ishizaka | H01S 5/06804 372/38.02 |
| 2013/0219697 A1* | 8/2013 | Ukai | H05K 13/00 29/593 |
| 2014/0341571 A1* | 11/2014 | Noda | H04B 10/504 398/38 |
| 2016/0134389 A1* | 5/2016 | Murayama | H04B 10/564 398/34 |

* cited by examiner

| TEMPE-RATURE (°C) | Ib(s) (mA) | Ith (mA) | OMI | Im(s) (mW) |
|---|---|---|---|---|
| 10 | 21.6667 | 5 | 0.3 | 0.5 |
| 15 | 26 | 6 | 0.3 | 0.5 |
| 20 | 35 | 10 | 0.3 | 0.5 |
| 25 | 45 | 15 | 0.3 | 0.5 |
| 30 | 55 | 20 | 0.3 | 0.5 |
| . | . | . | | |
| . | . | . | | |
| . | . | . | | |
| 80 | 116.6667 | 50 | 0.3 | 0.5 |

FIG. 4B

| TEMPE-RATURE (°C) | Ip(s) (mA) |
|---|---|
| 10 | 10 |
| 15 | 12 |
| 20 | 15 |
| 25 | 18 |
| 30 | 21 |
| . | . |
| . | . |
| . | . |
| 80 | 40 |

| TEMPE-RATURE (°C) | Ib(s) (V) | OMI | Im(s) (mW) |
|---|---|---|---|
| 10 | −2.1 | 0.3 | 0.5 |
| 15 | −2.2 | 0.3 | 0.5 |
| 20 | −2.3 | 0.3 | 0.5 |
| 25 | −2.4 | 0.3 | 0.5 |
| 30 | −2.5 | 0.3 | 0.5 |
| . | . | . | . |
| . | . | . | . |
| . | . | . | . |

FIG. 9

OPTICAL TRANSMISSION MODULE AND CONTROL METHOD OF OPTICAL TRANSMISSION MODULE

CROSS-REFERENCE TO RELATED APPLICATION

This application is based upon and claims the benefit of priority of the prior Japanese Patent Application No. 2016-130746, filed on Jun. 30, 2016, the entire contents of which are incorporated herein by reference.

FIELD

A certain aspect of embodiments described herein relates to an optical transmission module and a control method of an optical transmission module.

BACKGROUND

There may be a case where an optical modulation control of an optical transmitter is performed in a non-linear range because of secular degradation. In this case, it is preferable to improve degradation of an extinction ratio. And so, there is disclosed a technology in which an optical output control is performed in accordance with a measured temperature (see Japanese Patent Application Publication No. 2007-103398).

SUMMARY

However, the technology does not disclose to determine whether the optical transmitter is used in the non-linear range. It is therefore difficult to achieve a desirable extinction ratio.

According to an aspect of the present invention, there is provided an optical transmission module including: a bias current drive circuit configured to drive a bias current of a light-emitting element, on a basis of an input bias current setting value; a modulation current drive circuit configured to drive a modulation current of the light-emitting element, on a basis of an input modulation current setting value; a light-receiving element configured to measure an optical output power of the light-emitting element; a determiner configured to determine whether a difference between a target value of the optical output power and the optical output power measured by the light-receiving element is equal to or more than a threshold at the bias current setting value and the modulation current setting value; and a controller configured to perform a correction control to the bias current drive circuit so that the bias current is reduced in accordance with the difference, when it is determined that the difference is equal to or more than the threshold by the determiner.

According to another aspect of the present invention, there is provided a control method of an optical transmission module including: driving a bias current of a light-emitting element, on a basis of an input bias current setting value; driving a modulation current of the light-emitting element, on a basis of an input modulation current setting value; measuring an optical output power of the light-emitting element by a light-receiving element; determining whether a difference between a target value of the optical output power and the optical output power measured by the light-receiving element is equal to or more than a threshold at the bias current setting value and the modulation current setting value; and performing a correction control so that the bias current is reduced in accordance with the difference, when it is determined that the difference is equal to or more than the threshold.

According to another aspect of the present invention, there is provided an optical transmission module including: a bias voltage drive circuit configured to drive a bias voltage of a modulator for modulating an output light of a light-emitting element, on a basis of an input bias voltage setting value; a modulation voltage drive circuit configured to drive a modulation voltage of the modulator, on a basis of an input modulation voltage setting value; a light-receiving element configured to measure an optical output power of the modulator; a determiner configured to determine whether a difference between a target value of the optical output power and the optical output power measured by the light-receiving element is equal to or more than a threshold at the bias voltage setting value and the modulation voltage setting value; and a controller configured to perform a correction control to the bias voltage drive circuit so that the bias voltage is corrected in accordance with the difference, when it is determined that the difference is equal to or more than the threshold by the determiner.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
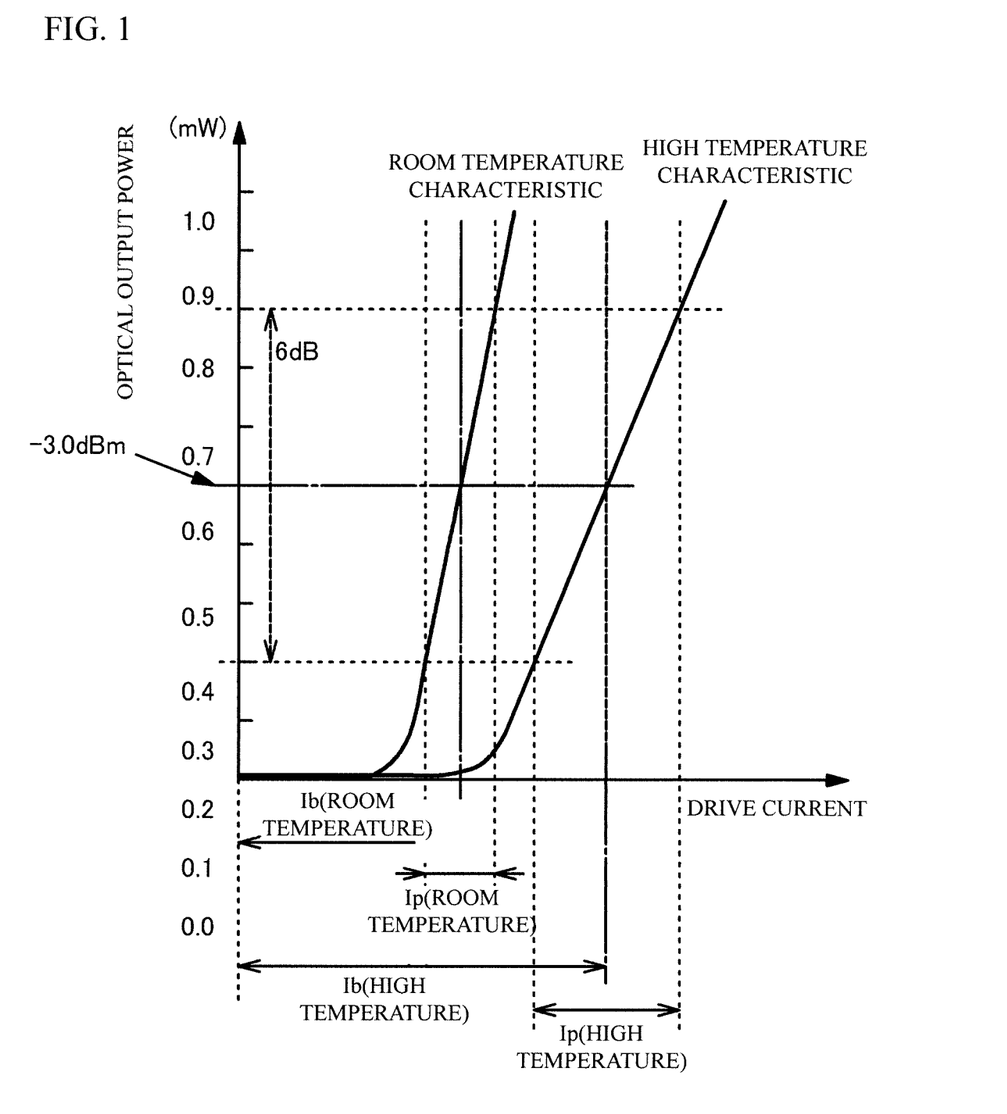
FIG. 1 illustrates a temperature characteristic of a laser diode.

A description will be given of a temperature characteristic of a laser diode. FIG. 1 illustrates the temperature characteristic of the laser diode. In FIG. 1, a horizontal axis indicates a drive current input to the laser diode. A vertical axis indicates an output optical power of the laser diode (mW). As illustrated in FIG. 1, when the drive current is equal to or less than a predetermined value, the laser diode does not output a light. When the drive current exceeds a predetermined value (oscillation threshold Ith), the laser diode starts to output a light.

In a direct modulation method in which a laser diode is used as a light-emitting element and a modulator, a bias current is applied to the laser diode and a modulation current is applied to the laser diode. As illustrated in FIG. 1, when the optical output power is set to −3.0 dBm, the bias current is set to Ib (room temperature). When the extinction ratio is set to 6 dB, the modulation current is set to Ip (room temperature). The Ip (room temperature) is a pulse current fluctuating to a plus side and a minus side with respect to the Ib (room temperature). In the present description, the modulation current is expressed by a pulse fluctuation range. Even if the modulation current is input to the laser diode, the optical output power is −3.0 dBm, because an average power of the optical output power of the laser diode is detected by the photo diode.

When a temperature is relatively low as in the case of room temperature, an optical output power of the laser diode is proportional to the drive current in a range exceeding the oscillation threshold. In this case, it is possible to set the modulation current with use of the bias point as a symmetrical point. It is therefore possible to set the modulation current with use of the optical output power detected by the photodiode as the symmetrical point.

As the temperature increases, an inclination of the optical output power with respect to the drive current is reduced. Thus, in a high temperature condition, it is necessary to set the bias current to the Ib (high temperature) larger than the Ib (room temperature) in order to achieve the optical output power (−3.0 dBm) corresponding to the room temperature. Moreover, in order to achieve an extinction ratio (6 dB) corresponding to the room temperature, it is necessary to set the modulation current to the Ip (high temperature) larger than the Ip (room temperature). When the optical output power is proportional to the drive current in a range exceeding the oscillation threshold in the high temperature condition, it is possible to set the modulation current with use of the bias point as the symmetrical point. That is, it is possible to set the modulation current with use of the optical output power detected by the photodiode as the symmetrical point.

However, when the laser diode is secularly degraded, an increasing rate of an optical output power with respect to the increasing of the drive current may decrease in a high temperature condition. That is, a non-linear characteristic may occur between the optical output power and the drive current. In this case, it is not possible to set the bias point as a symmetrical point, in a case of achieving a predetermined extinction ratio.

Figure 2:
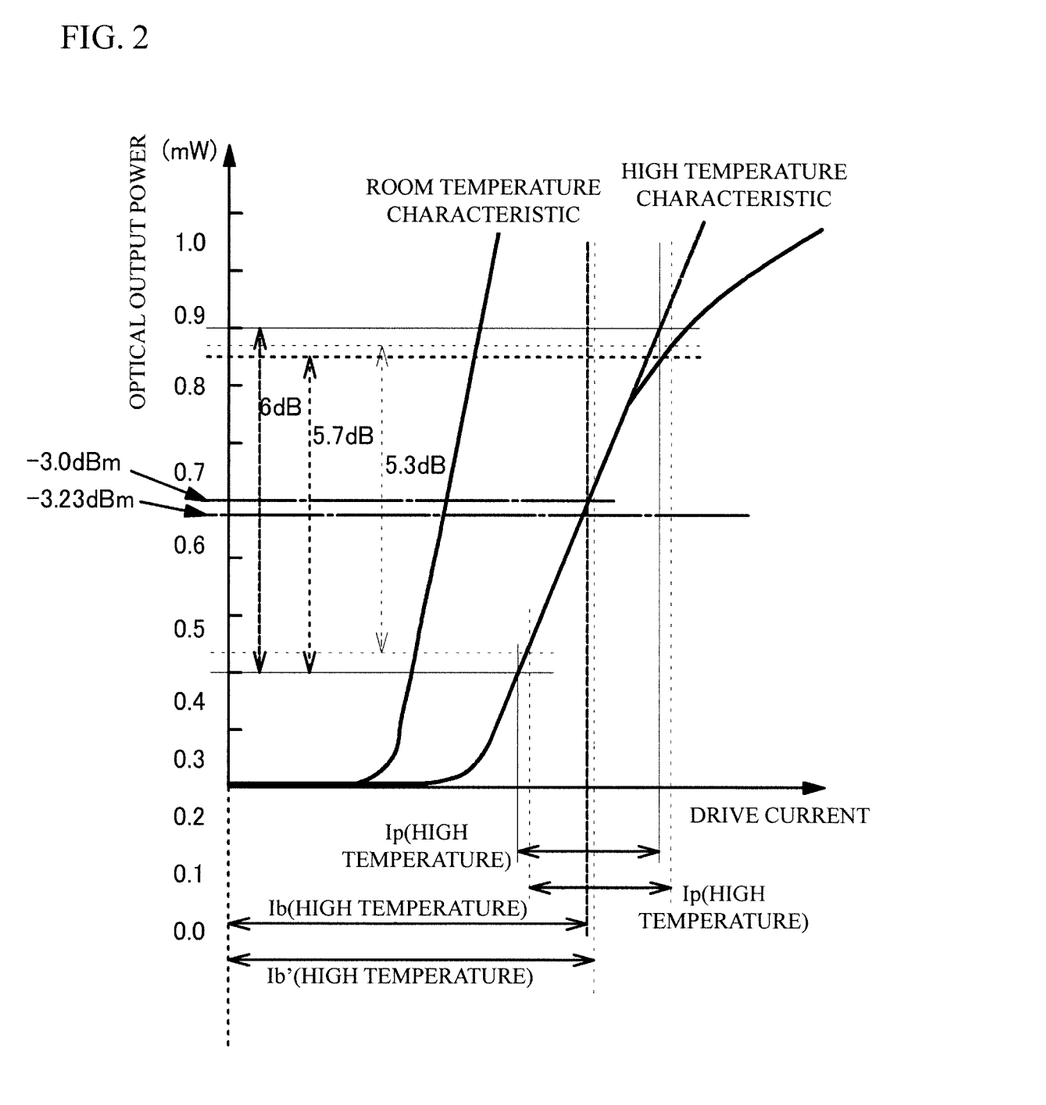
FIG. 2 illustrates a temperature characteristic of a laser diode.

In concrete, as illustrated in FIG. 2, when the bias current is set to the Ib (high temperature) and the modulation current is set to the Ip (high temperature), the optical output power on the high current side of the modulation current may be reduced because of the non-linear characteristic. In this case, the extinction ration may be reduced. In FIG. 2, the extinction ratio is approximately 5.7 dB (<6.0 dB). The optical output power detected by the photo diode is reduced, because the optical power detected by the photo diode is an average power.

In FIG. 2, the detected optical output power is −3.23 dBm. When an APC control is performed, the bias current increases because the bias current is controlled to a current for achieving the optical output power of −3.0 dBm. In FIG. 2, the bias current is expressed by Ib' (high temperature). In this case, the optical output power is further reduced in the high current side of the Ip (high temperature), compared to the case where a linear characteristic achieved. Therefore, the extinction ratio is further reduced. In FIG. 2, the extinction ratio is reduced to approximately 5.3 dB.

Accordingly, in a case where the non-linear characteristic occurs between the optical output power and the drive current, a desirable extinction ratio is not achieved when a normal APC control is performed. And so, in the following embodiments, a description will be given of an optical transmission module and a control method of the optical transmission module that are capable of achieving a desirable extinction ratio even if the above-mentioned non-linear characteristic occurs.

First Embodiment

Figure 3:
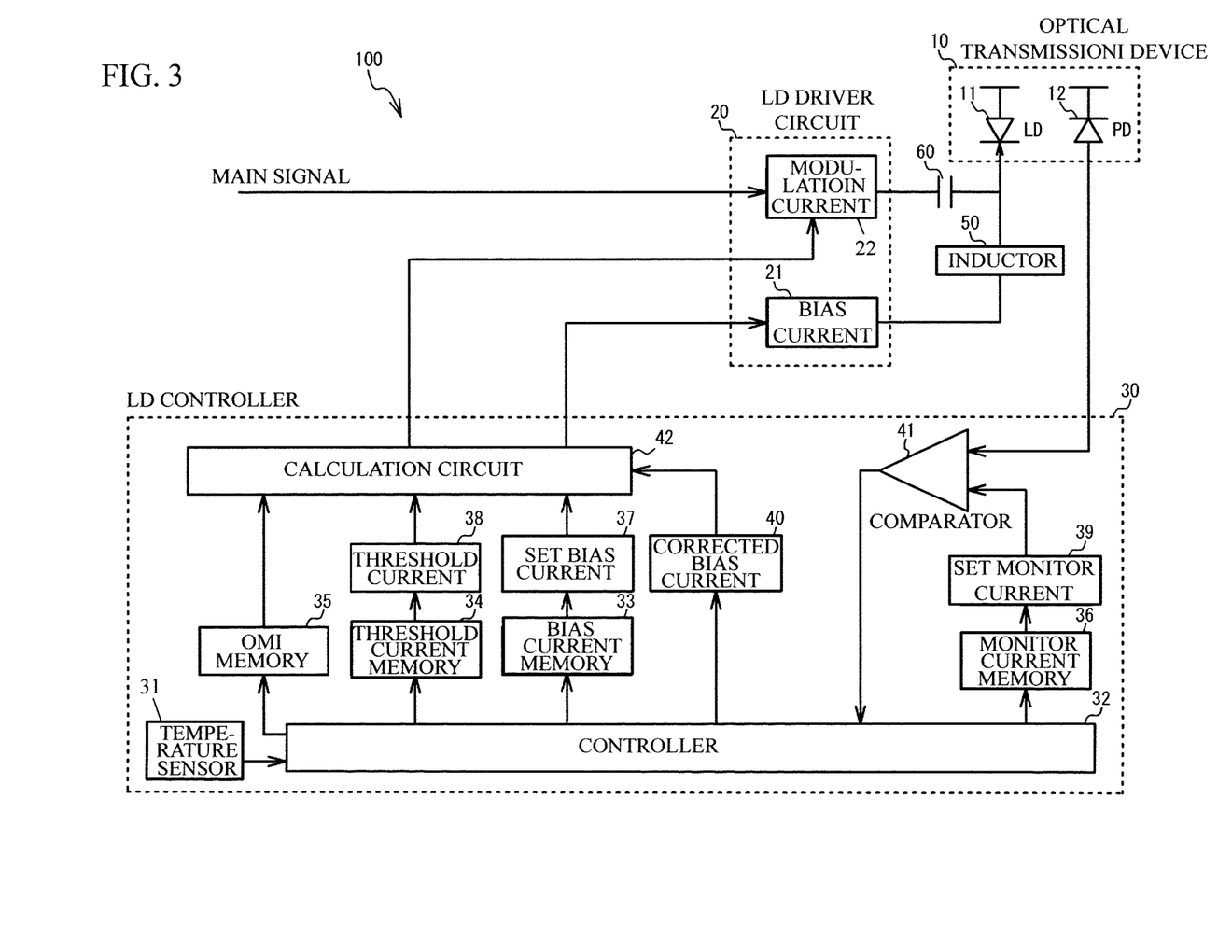
FIG. 3 illustrates a block diagram of an overall structure of an optical transmission module in accordance with a first embodiment.

FIG. 3 illustrates a block diagram of an overall structure of an optical transmission module 100 in accordance with a first embodiment. As illustrated in FIG. 3, the optical transmission module 100 has an optical transmission device 10 an LD drive circuit 20 and an LD controller 30.

The optical transmission device 10 has a laser diode 11 and a photo diode (light receiving element) 12. In the embodiment, the laser diode 11 is used as a direct modulator because a modulation signal is extracted by supplying a modulation current to the laser diode 11.

The LD drive circuit 20 has a bias current drive circuit 21 and a modulation current drive circuit 22. The LD controller 30 has a temperature sensor 31, a controller 32, a data memory, a current generation circuit, a comparator circuit 41 and a calculation circuit 42. The data memory has a bias current data memory 33, a threshold current data memory 34, a coefficient OMI data memory 35 and a monitor current data memory 36. The current generation circuit has a set bias current generation circuit 37, a threshold current generation circuit 38, a set monitor current generation circuit 39 and a corrected bias current generation circuit 40. For example, the controller 32 has a processor and a memory storing a program for controlling the processor, a FPGA (Field Programmable Gate Array), or an IC (Integrated Circuit).

Figure 4A:
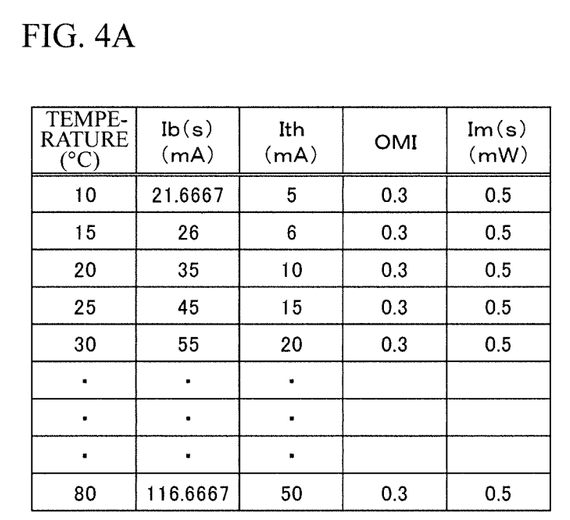
FIG. 4A illustrates an example of a data table stored in a data memory.

FIG. 4A illustrates an example of a data table stored in the data memory. As illustrated in FIG. 4A, the data table stores a set bias current Ib(s)(mA), a threshold current Ith(mA), a coefficient OMI and a set monitor current Im(s)(mA), each of which is related with a temperature. In the example of FIG. 4A, electrical powers (mW) related with the set monitor current Im(s)(mA) are stored. The coefficient OMI is a coefficient for calculating a set modulation current Ip(s) from the set bias current and the threshold current Ith. For example, the coefficient OMI is expressed by $(Ip(s)/2)/(Ib(s)-Ith)$. The threshold current Ith is a current value at which the laser diode 11 starts an oscillation. For example, the threshold current Ith is a current value obtained by extending a proportional relationship between a drive current and an optical output power toward a lower optical output power.

Figure 4B:
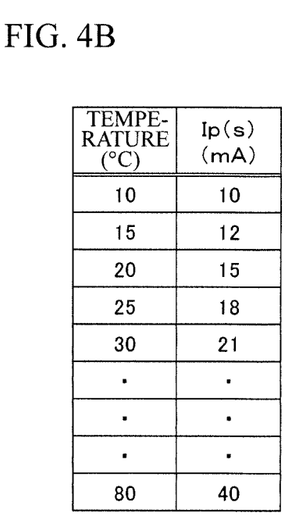
FIG. 4B illustrates a set modulation current Ip(s) calculated with use of a coefficient OMI.

It is possible to measure these set currents at an acceptance test or the like in advance. The set bias current Ib(s) is stored in the bias current data memory 33. The threshold current Ith is stored in the threshold current data memory 34. The coefficient OMI is stored in the coefficient OMI data memory 35. The set monitor current Im(s) is stored in the monitor current data memory 36. Each data may be stored as a form of a temperature function instead of the table. FIG. 4B illustrates the set modulation current Ip(s) calculated with use of the coefficient OMI.

A description will be given of an operation of the optical transmission module 100 on the basis of FIG. 3, FIG. 4A and FIG. 4B. The temperature sensor 31 converts a temperature of the laser diode 11 into an electrical signal and inputs the electrical signal in the controller 32. The controller 32 detects the temperature of the laser diode 11, on the basis of the electrical signal input from the temperature sensor 31. The controller 32 makes the bias current data memory 33 output a value of the set bias current Ib(s) corresponding to the detected temperature to the set bias current generation circuit 37. The set bias current generation circuit 37 generates a current (the set bias current Ib(s)) of a value input from the bias current data memory 33, and inputs the current in the calculation circuit 42. The calculation circuit 42 inputs the set bias current Ib(s) in the bias current drive circuit 21. The bias current drive circuit 21 inputs the set bias current Ib(s) input from the controller 32 to the laser diode 11. Thus, the laser diode 11 outputs a light of an optical output power at a bias point determined by the set bias current Ib(s).

The controller 32 makes the threshold current data memory 34 output a value of the threshold current Ith corresponding to the detected temperature to the threshold current generation circuit 38. The threshold current generation circuit 38 generates a current (threshold current Ith) of a value input from the threshold current data memory 34 and inputs the generated threshold current to the calculation circuit 42. The controller 32 makes the coefficient OMI data memory 35 output a value of the coefficient OMI corresponding to the detected temperature to the calculation circuit 42.

The calculation circuit 42 calculates the set modulation current Ip(s) from the threshold current Ith, the coefficient OMI and the set bias current Ib(s). In concrete, the calculation circuit 42 calculates the set modulation current Ip(s) in accordance with a following formula (1). The modulation current drive circuit 22 inputs a pulse current according to an input main signal to the laser diode 11 with a modulation range of the set modulation current Ip(s). The laser diode 11 modulates an output light with an extinction ratio of a modulation range determined by the set modulation current Ip(s).

$$Ip(s)=OMI \times 2 \times (Ib(s)-Ith) \quad (1)$$

The photodiode 12 receives the output light of the laser diode 11. The photodiode 12 converts the received optical power into an electrical signal by a photo-electro conversion and inputs the electrical signal in the comparator circuit 41. An inductor 50 is arranged between the bias current drive circuit 21 and the laser diode 11. Thus, inputting of an alternate signal from the bias current drive circuit 21 to the laser diode 11 is prevented. A capacitor 60 is arranged between the modulation current drive circuit 22 and the laser diode 11. Thus, inputting of a direct signal from the modulation current drive circuit 22 to the laser diode 11 is prevented.

The controller 32 makes the monitor current data memory 36 output a value of the set monitor current Im(s) corresponding to the detected temperature to the set monitor current generation circuit 39. The set monitor current generation circuit 39 generates a current (set monitor current Im(s)) of a value input from the monitor current data memory 36 and inputs the current in the comparator circuit 41. The comparator circuit 41 inputs a comparison result between the monitor current Im(m) input from the photodiode 12 and the set monitor current Im(s) input from the set monitor current generation circuit 39 to the controller 32.

The controller 32 detects a difference Δim between the set monitor current Im(s) and the monitor current Im(m). The set monitor current Im(s) corresponds to a target value of the optical output power of the laser diode 11 at the set bias current Ib(s) and the set modulation current Ip(s). When the difference Δim is small, a high side optical output power and a low side optical output power of the modulation light is symmetrical with respect to the set bias current Ib(s). Therefore, the linear characteristic is maintained. On the other hand, when the difference Δim is large, the high side optical output power of the modulation light is reduced. And, the high side optical output power and the low side optical power cannot maintain the symmetrical relationship. Therefore, when the difference Δim is large, it is possible to determine that the non-linear characteristic explained in FIG. 2 occurs. For example, the difference Δim may be a difference between the set monitor current Im(s) and the monitor current Im(m), a ratio of them or the like.

When the difference is equal to or more than a threshold, it is possible to suppress the influence of the non-linear characteristic by reducing the bias current. And so, the corrected bias current generation circuit 40 generates the corrected bias current Ib(c) by reducing the set bias current Ib(s) in accordance with the difference Δim. The corrected bias current generation circuit 40 inputs the generated corrected bias current Ib(c) to the calculation circuit 42. The calculation circuit 42 inputs the corrected bias current Ib(c) to the bias current drive circuit 21. The bias current drive circuit 21 inputs the corrected bias current Ib(c) to the laser diode 11. Thus, the bias current of the laser diode 11 is corrected to the corrected bias current Ib(c). In this case, the bias current fluctuates. Therefore, a modulation degree (ratio of the bias current to the modulation current) may fluctuate. And so, the calculation circuit 42 changes the modulation current so that the changing of the modulation degree is suppressed.

For example, it is assumed that the monitor current Im(m) (<Im(s)) is detected with respect to the set monitor current Im(s). The corrected bias current generation circuit 40 calculates a ratio R of the monitor current Im(m) to the set monitor current Im(s) in accordance with a following formula (2). Next, the corrected bias current generation circuit 40 calculates a difference S between the set bias current Ib(s) and the threshold current Ith in accordance with a following formula (3).

$$\text{ratio } R=Im(m)/Im(s) \quad (2)$$

$$\text{difference } S=Ib(s)-Ith \quad (3)$$

Next, the corrected bias current generation circuit 40 calculates a non-linear value of the modulation current in accordance with a following formula (4), with use of the results of the formula (2) and the formula (3). Next, the corrected bias current generation circuit 40 generates the corrected bias current Ib(c) by subtracting the non-linear value from the set bias current Ib(s) in accordance with the formula (4) and inputs the corrected bias current Ib(c) to the bias current drive circuit 21.

$$\text{non-linear value}=\text{difference } S \times (1-\text{ratio } R) \quad (4)$$

$$\text{corrected bias current } Ib(c)=\text{set bias current } Ib(s)-\text{non-linear value} \quad (5)$$

Next, the calculation circuit 42 calculates the corrected modulation current Ip(c) from the threshold Ith, the coefficient OMI and the corrected bias current Ib(c). In concrete, the calculation circuit 42 calculates the corrected modulation current Ip(c) in accordance with the above-mentioned formula (1). The modulation current drive circuit 22 inputs a pulse current according to the input main signal in the laser diode 11, with a modulation range of the corrected modulation current Ip(c). The laser diode 11 modulates the output light with an extinction ratio with a modulation range determined by the corrected modulation current Ip(c).

For example, it is assumed that the electrical power=0.45 mW corresponding to the monitor current Im(m) is detected with respect to the electrical power=0.5 mW corresponding to the set monitor current Im(s). In this case, the ratio R is 0.45/0.5=0.9. The difference S is 116.6667−50=66.6667. The non-linear value is 66.6667×(1-0.9)=6.6667. The corrected bias current Ib(c) is 116.6667−6.6667=110. The corrected bias current Ip(c) is 0.3×(110-50)×2=36.

Figure 5:
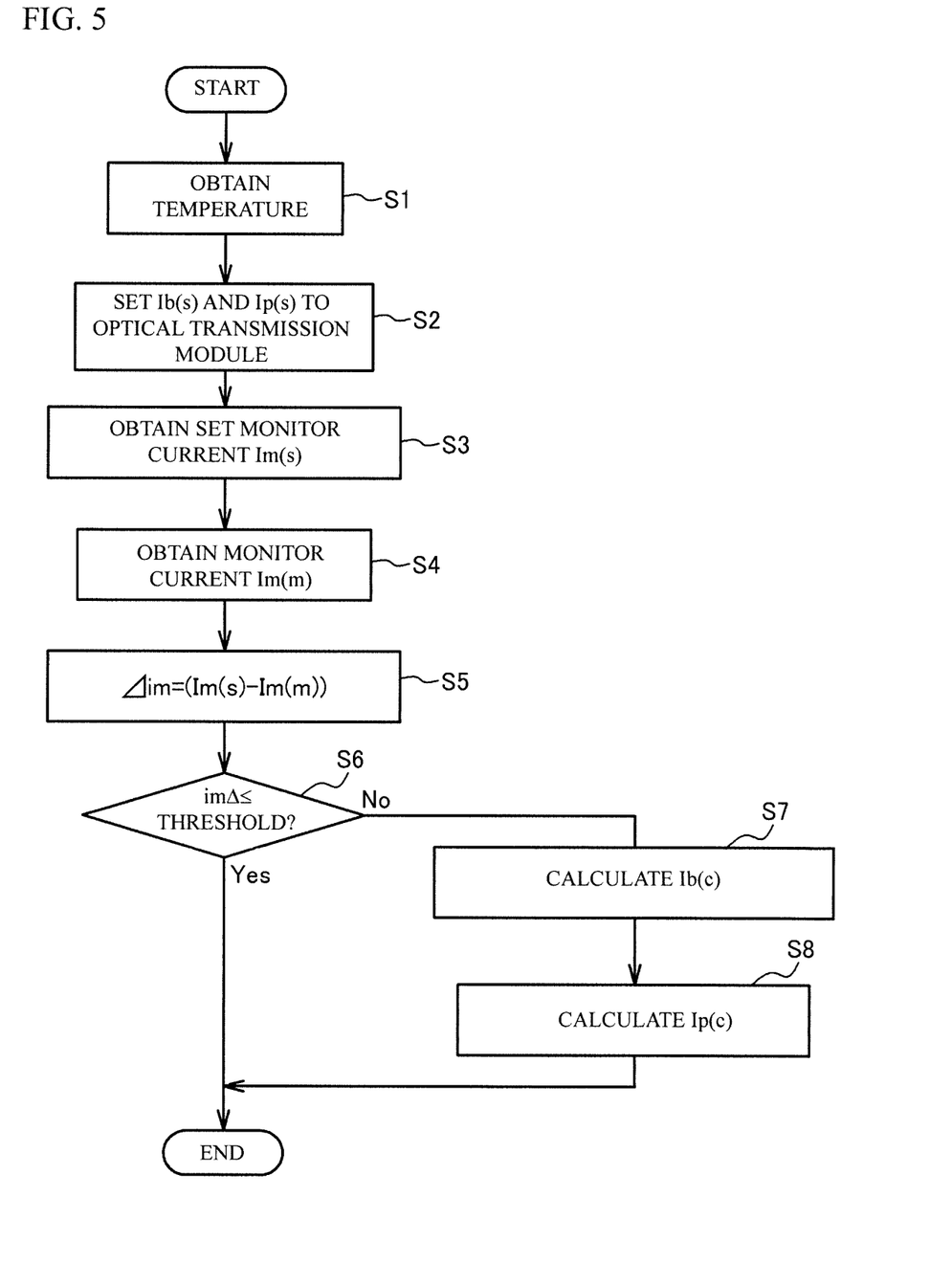
FIG. 5 illustrates an example of a flowchart of a calculation process of a corrected bias current Ib(c) and a corrected modulation current Ip(c)

FIG. 5 illustrates an example of a flowchart of a calculation process of the above-mentioned corrected bias current Ib(c) and the above-mentioned corrected modulation current Ip(c). As illustrated in FIG. 5, the controller 32 obtains a temperature of the laser diode 11, on the basis of the detection result of the temperature sensor 31 (Step S1). Next, the controller 32 makes the bias current data memory 33 output a value of the set bias current Ib(s) corresponding to the detected temperature.

The controller 32 makes the bias current data memory 33 output a value of the threshold current Ith corresponding to the detected temperature. The controller 32 makes the bias current data memory 33 output a value of the coefficient OMI corresponding to the detected temperature. Thus, the bias current drive circuit 21 sets the set bias current Ib(s) to the laser diode 11. The modulation current drive circuit 22 sets the set modulation current Ip(s) to the laser diode 11 (Step S2).

Next, the controller 32 makes the monitor current data memory 36 output a value of the set monitor current Im(s) corresponding to the temperature obtained in Step S1 (Step S3). Thus, the set monitor current Im(s) is input to the comparator circuit 41. The photodiode 12 obtains the monitor current Im(m) (Step S4). Thus, the monitor current Im(s) is input to the comparator circuit 41. Next, the controller 32 receives a comparison result of the comparator circuit 41 and calculates the difference Δim in accordance with a following formula (5) (Step S5). By calculating the difference Δim, an error of the monitor current Im(m) from the set monitor current Im(s) can be calculated.

$$\Delta im = Im(s) - Im(m) \quad (5)$$

Next, the controller 32 determines whether the difference Δim is equal to or less than a threshold (Step S6). When it is determined as "Yes" in Step S6, the bias current and the modulation current are not corrected. Thus, unnecessary correction control is suppressed.

When it is determined as "No" in Step S6, the corrected bias current generation circuit 40 calculates the corrected bias current Ib(c) in accordance with the formulas (2) to (5) (Step S7). Thus, the bias current drive circuit 21 corrects the bias current of the laser diode 11. Next, the calculation circuit 42 calculates the corrected modulation current Ip(c) from the threshold current Ith, the coefficient OMI and the corrected bias current Ib(c) (Step S8). Thus, the modulation current drive circuit 22 corrects the modulation current. After that, the flowchart is terminated.

In the embodiment, it is possible to determine whether the non-linear characteristic occurs by determining whether the difference between the set monitor current Im(s) and the monitor current Im(m) at a predetermined temperature is larger than a threshold. That is, it is possible to determine whether the non-linear characteristic occurs by determining whether the difference between the target value of the optical output power and the measured value at the set bias current Ib(s) and the set modulation current Ip(s). When the bias current is reduced in accordance with the difference, the influence of the non-linear characteristic is suppressed. That is, a desirable extinction ratio can be achieved. Moreover, it is possible to suppress the changing of the modulation degree by performing a correction for reducing the modulation current in accordance with the reduced bias current. Achieving of the desirable extinction ratio is specifically effective in a multi-value modulation method such as PAM4 (Pulse Amplitude Modulation), DMT (Discrete Multi-Tone) or the like.

In the embodiment, the bias current drive circuit 21 acts as an a bias current drive circuit configured to drive a bias current of a light-emitting element, on a basis of an input bias current setting value. The modulation current drive circuit 22 acts as an a modulation current drive circuit configured to drive a modulation current of the light-emitting element, on a basis of an input modulation current setting value. The controller 32 acts as a determiner configured to determine whether a difference between a target value of the optical output power and the optical output power measured by the light-receiving element is equal to or more than a threshold at the bias current setting value and the modulation current setting value. The calculation circuit 42 acts as an a controller configured to perform a correction control to the bias current drive circuit so that the bias current is reduced in accordance with the difference, when it is determined that the difference is equal to or more than the threshold by the determiner.

Second Embodiment

Figure 6:
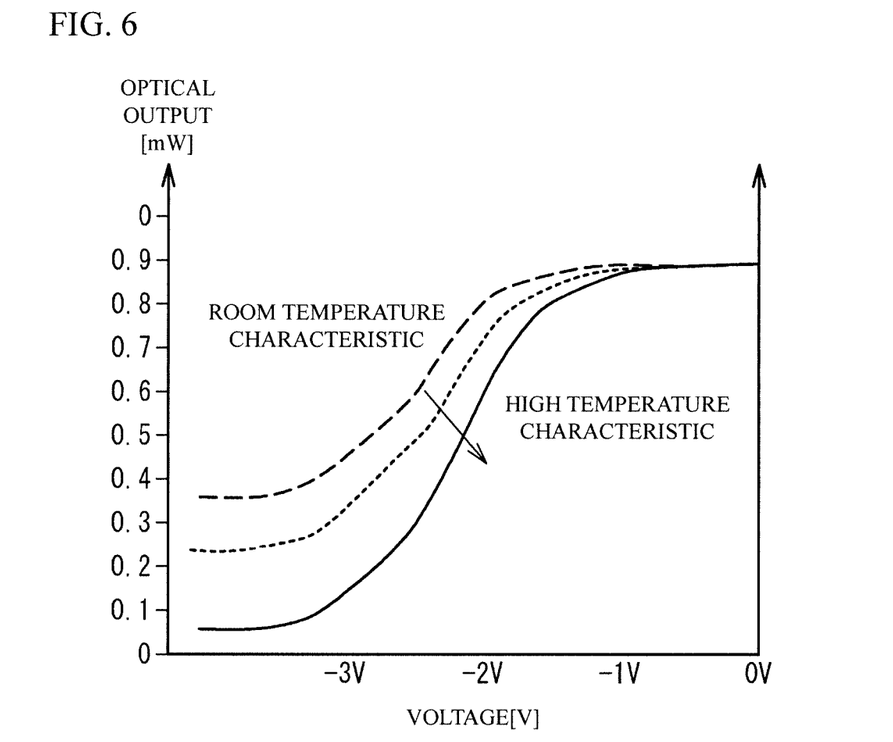
FIG. 6 illustrates an extinction characteristic of an external modulator used for an external modulation method.

In a second embodiment, a description will be given of a case where a bias voltage is corrected in an external modulation method. FIG. 6 illustrates an extinction characteristic of an external modulator used in the external modulation method. The external modulator is an electro-absorption optical modulator, an electro-optical effect modulator or the like. In FIG. 6, a horizontal axis indicates a voltage (V) applied to the external modulator. A vertical axis indicates an optical output (mW) obtained from the external modulator.

As illustrated in FIG. 6, as the applied voltage increases, an inclination gradually increases. The inclination approximately becomes constant in a predetermined voltage range. In a voltage range larger than the voltage range, the inclination gradually decreases. When the voltage range (linear characteristic range) in which the inclination is approximately constant is used, a preferable extinction ratio can be achieved. In concrete, a preferable extinction ratio can be achieved, when a center of the linear characteristic range is used as the bias voltage and a voltage fluctuating to a higher side and to a lower side with respect to the bias voltage is used as the modulation voltage.

The extinction characteristic of the external modulator fluctuates in accordance with the temperature. For example, as illustrated in FIG. 6, when the temperature is relatively low as in the case of the room temperature, a higher optical output is achieved with respect to a relatively low applied voltage. When the temperature increases, the optical output with respect to the applied voltage decreases. When the external modulator is not secularly degraded, the extinction characteristic is determined by the temperature. Therefore, it is possible to measure the extinction characteristic at an acceptance test or the like in advance. However, the external modulator is secularly degraded, the extinction characteristic may fluctuate. For example, the optical output decreases in a voltage range lower than the linear characteristic range. Alternately, the optical output decreases in a voltage range higher than the linear characteristic range. Thus, when the external modulator is secularly degraded, the bias voltage is off the center of the linear characteristic range. In this case, the modulation voltage range is off the linear characteristic range. And it is not possible to use the bias point as the symmetrical point when a predetermined extinction ratio is achieved.

Accordingly, in a case where the non-linear characteristic occurs between the optical output power and the drive voltage, a desirable extinction ratio is not achieved when a normal APC control is performed. And so, in the second embodiment, a description will be given of an optical transmission module and a control method of the transmission module that are capable of achieving a desirable extinction ratio even if the above-mentioned non-linear characteristic occurs.

Figure 7:
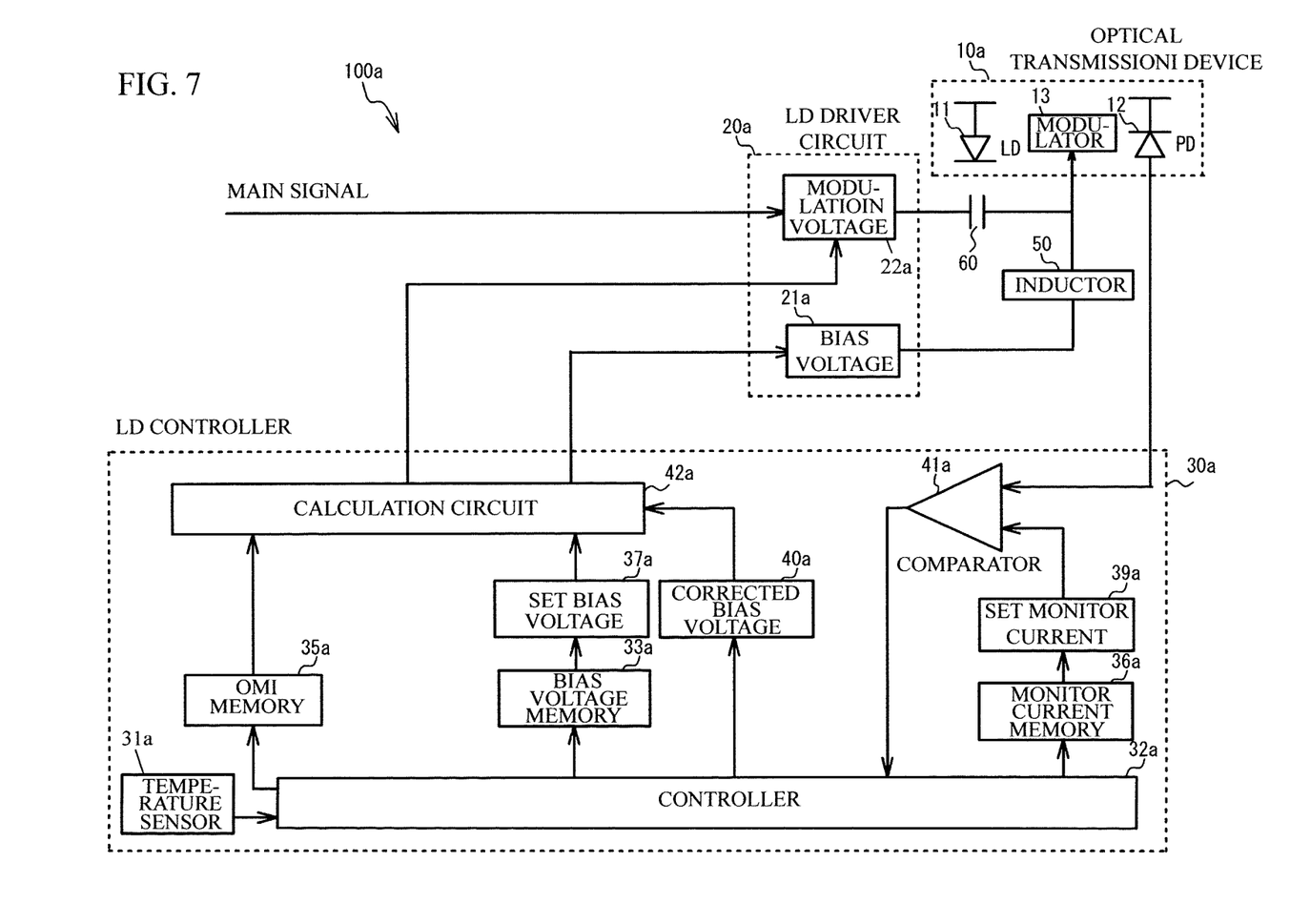
FIG. 7 illustrates a block diagram of an overall structure of an optical transmission module in accordance with a second embodiment.

FIG. 7 illustrates a block diagram of an overall structure of an optical transmission module 100a in accordance with a second embodiment. As illustrated in FIG. 7, the optical transmission module 100a has an optical transmission device 10a, an LD drive circuit 20a and an LD controller 30a.

The optical transmission device 10a has the laser diode 11, a modulator 13 and the photodiode (light receiving element) 12. In the embodiment, a modulation signal is extracted by supplying a modulation current to the modulator 13. Therefore, the modulation current is not supplied to the laser diode 11. For example, the modulator 13 may be an electro-absorption optical modulator, an electro-optical effect modulator or the like.

The LD drive circuit 20a has a bias voltage drive circuit 21a and a modulation voltage drive circuit 22a. The LD controller 30a has a temperature sensor 31a, a controller 32a, a data memory, a generation circuit, a comparator circuit 41a and a calculation circuit 42a. The data memory has a bias voltage data memory 33a, a coefficient OMI data memory 35a and a monitor current data memory 36a. The generation circuit has a set bias voltage generation circuit 37a, a set monitor current generation circuit 39a and a corrected bias voltage generation circuit 40a. For example, the controller 32a has a processor and a memory storing a program for controlling the processor, a FPGA (Field Programmable Gate Array), or an IC (Integrated Circuit).

Figure 8:
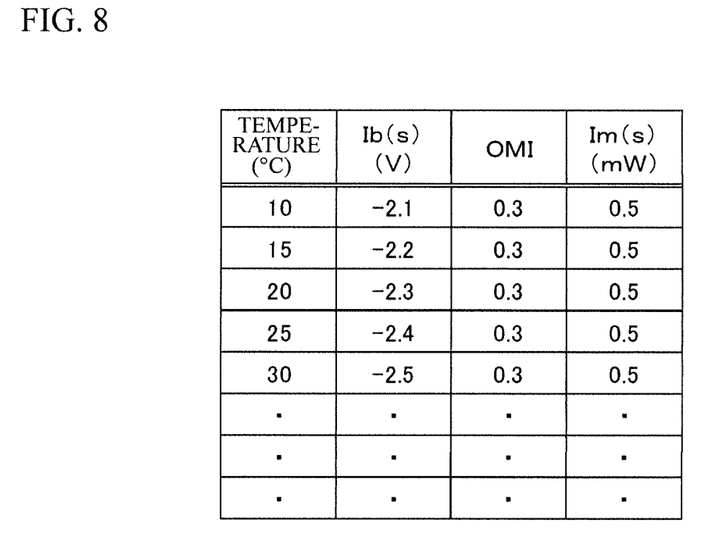
FIG. 8 illustrates an example of a data table stored in a data memory.

FIG. 8 illustrates an example of a data table stored in the data memory. As illustrated in FIG. 8, the data table stores a set bias voltage Vb(s)(V), a coefficient OMI and a set monitor current Im(s)(mA), each of which is related with a temperature. In the example of FIG. 8, electrical powers (mW) related with the set monitor current Im(s) are stored. The coefficient OMI is a coefficient for calculating a set modulation voltage Vp(s) from the set bias voltage. For example, the coefficient OMI is expressed by (Vp(s)/2)/Vb(s).

It is possible to measure these set voltages and set currents at an acceptance test or the like in advance. The set bias voltage Vb(s) is stored in the bias voltage data memory 33a. The coefficient OMI is stored in the coefficient OMI data memory 35a. The set monitor current Im(s) is stored in the monitor current data memory 36a. Each data may be stored as a form of a temperature function instead of the table.

A description will be given of an operation of the optical transmission module 100a on the basis of FIG. 7 and FIG. 8. The temperature sensor 31a converts a temperature of the modulator 13 into an electrical signal and inputs the electrical signal in the controller 32a. The controller 32a detects the temperature of the modulator 13, on the basis of the electrical signal input from the temperature sensor 31a. The controller 32a makes the bias voltage data memory 33a output a value of the set bias voltage Vb(s) corresponding to the detected temperature to the set bias voltage generation circuit 37a. The set bias voltage generation circuit 37a generates a voltage (set bias voltage Vb(s)) of a value input from the bias voltage data memory 33a, and inputs the voltage in the calculation circuit 42a. The calculation circuit 42a inputs the set bias voltage Vb(s) in the bias voltage drive circuit 21a. The bias voltage drive circuit 21a inputs the set bias voltage Vb(s) input from the controller 32a to the modulator 13. Thus, the modulator 13 outputs a light of an optical output power at a bias point determined by the set bias voltage Vb(s).

The controller 32a makes the coefficient OMI data memory 35a output a value of the coefficient OMI corresponding to the detected temperature to the calculation circuit 42a. The calculation circuit 42a calculates the set modulation voltage Vp(s) from the coefficient OMI and the set bias voltage Vb(s). In concrete, the calculation circuit 42a calculates the set modulation voltage Vp(s) in accordance with a following formula (6). The modulation voltage drive circuit 22a inputs a pulse voltage according to an input main signal, with a modulation range of the set modulation voltage Vp(s). The modulator 13 modulates an output light with an extinction ratio of a modulation range determined by the set modulation voltage Vp(s).

$$Vp(s)=OMI \times 2 \times Vb(s) \qquad (6)$$

The photodiode 12 receives the output light of the modulator 13. The photodiode 12 converts the received optical power into an electrical signal by a photoelectric conversion and inputs the electrical signal in the comparator circuit 41a. The inductor 50 is arranged between the bias voltage drive circuit 21a and the laser diode 11. Thus, inputting of an alternate signal from the bias voltage drive circuit 21a to the modulator 13 is prevented. The capacitor 60 is arranged between the modulation voltage drive circuit 22a and the modulator 13. Thus, inputting of a direct signal from the modulation voltage drive circuit 22a to the modulator 13 is prevented.

The controller 32a makes the monitor current data memory 36a output a value of the set monitor current Im(s) corresponding to the detected temperature to the set monitor current generation circuit 39a. The set monitor current generation circuit 39a generates a current (set monitor current Im(s)) of a value input from the monitor current data memory 36a and inputs the current in the comparator circuit 41a. The comparator circuit 41a inputs a comparison result between the monitor current Im(m) input from the photodiode 12 and the set monitor current Im(s) input from the set monitor current generation circuit 39a to the controller 32a.

The controller 32a detects a difference an absolute value of Δim between the set monitor current Im(s) and the monitor current Im(m). The set monitor current Im(s) corresponds to a target value of the optical output power of the modulator 13 at the set bias current Ib(s) and the set modulation current Ip(s). When the absolute value of the difference Δim is small, a high side optical output power and a low side optical output power of the modulation light is symmetrical with respect to the set bias current Ib(s). Therefore, the linear characteristic is maintained. On the other hand, when the absolute value of the difference Δim is large, the high side optical output power and the low side optical power cannot maintain the symmetrical relationship. Therefore, when the absolute value of the difference Δim is large, it is possible to determine that the non-linear characteristic explained in FIG. 6 occurs. For example, the difference Δim may be a difference between the set monitor current Im(s) and the monitor current Im(m), a ratio of them or the like.

When the absolute value of the difference is equal to or more than a threshold, it is possible to suppress the influence of the non-linear characteristic by correcting the bias voltage. And so, the corrected bias voltage generation circuit 40a generates the corrected bias voltage Vb(c) by correcting the set bias voltage Vb(s) in accordance with the difference Δim. The corrected bias voltage generation circuit 40a inputs the generated corrected bias voltage Vb(c) to the calculation circuit 42a. The calculation circuit 42a inputs the corrected bias voltage Vb(c) to the bias voltage drive circuit 21a. The bias voltage drive circuit 21a inputs the corrected bias voltage Vb(c) to the laser diode 11. Thus, the bias voltage of the laser diode 11 is corrected to the corrected bias voltage Vb(c). In this case, the bias voltage may fluctuate. Therefore, a modulation degree (ratio of the bias voltage to the modulation voltage) may fluctuate. And so, the calculation circuit 42a changes the modulation voltage so that the changing of the modulation degree is suppressed.

For example, the corrected bias voltage generation circuit 40a generates the corrected bias voltage Vb(c) by feedback control so that the monitor current Im(m) gets closer to the set monitor current Im(s). In the embodiment, the corrected bias voltage generation circuit 40a generates the corrected bias voltage Vb(c) so that the set monitor current Im(s) is in consistence with the monitor current Im(m). Next, the calculation circuit 42a calculates the corrected modulation voltage Vp(c) from the coefficient OMI and the corrected bias voltage Vb(c). In concrete, the calculation circuit 42a calculates the corrected modulation voltage Vp(c) in accordance with the formula (6). The modulation voltage drive circuit 22a inputs a pulse voltage according the input main signal, with a modulation range of the corrected modulation voltage Vp(c). The modulator 13 modulates the output light with an extinction ratio of a modulation range determined by the corrected modulation voltage Vp(c). When the bias voltage is corrected so that the monitor current Im(m) is in consistence with the set monitor current Im(s) even if the non-linear characteristic occurs, the bias voltage is positioned around center of the linear characteristic.

Figure 9:
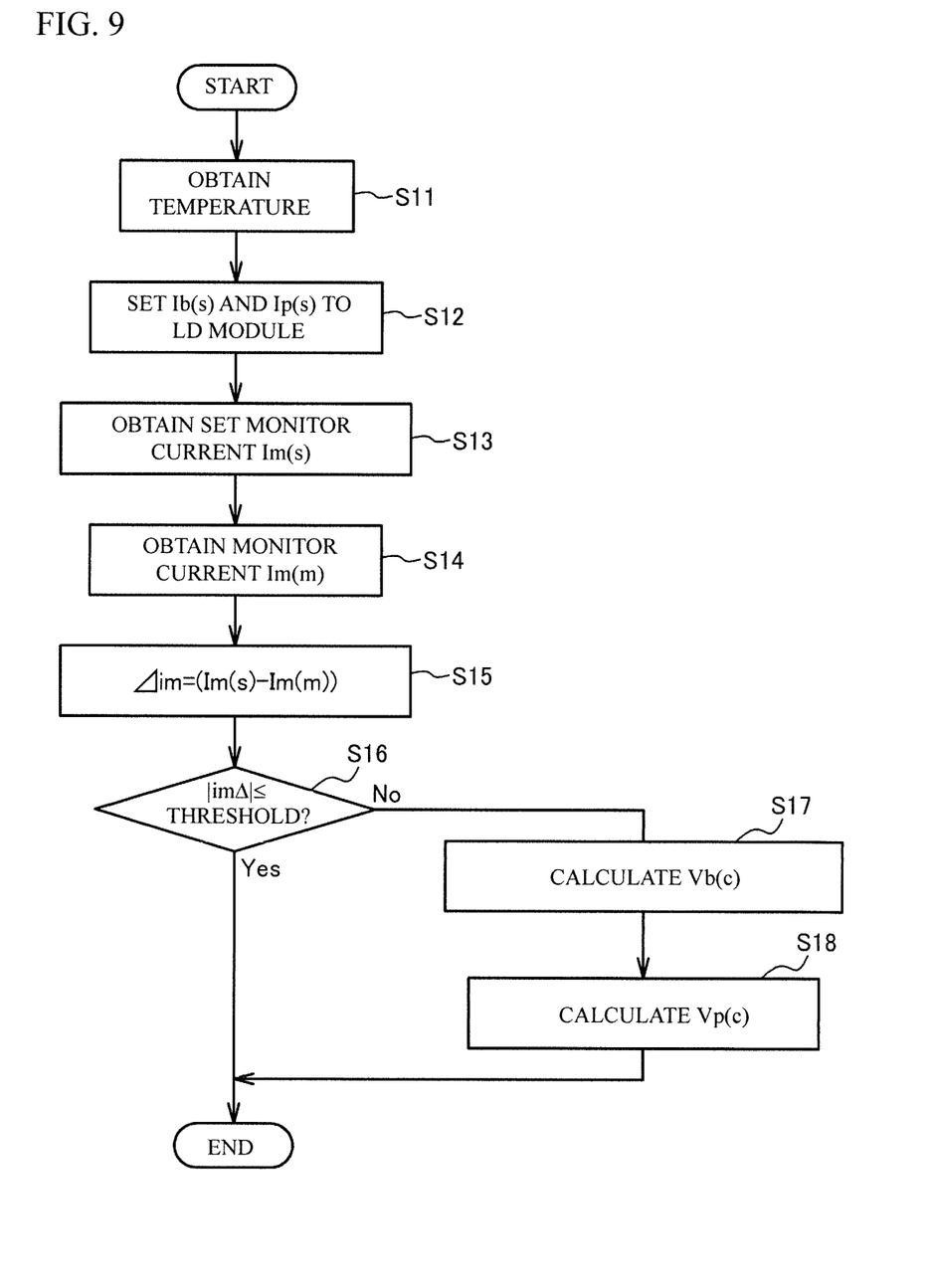
FIG. 9 illustrates an example of a flowchart of a calculation process of a corrected bias voltage Vb(c) and a corrected modulation voltage Vp(c).

FIG. 9 illustrates an example of a flowchart of a calculation process of the above-mentioned corrected bias voltage Vb(c) and the above-mentioned corrected modulation voltage Vp(c). As illustrated in FIG. 9, the controller 32a obtains a temperature of the modulator 13, on the basis of the detection result of the temperature sensor 31a (Step S11). Next, the controller 32a makes the bias voltage data memory 33a output a value of the set bias voltage Vb(s) corresponding to the detected temperature. The controller 32a makes the bias voltage data memory 33a output a value of the coefficient OMI corresponding to the detected temperature. Thus, the bias voltage drive circuit 21a sets the set bias voltage Vb(s) to the laser diode 11. The modulation voltage drive circuit 22a sets the set modulation voltage Vp(s) to the laser diode 11 (Step S12).

Next, the controller 32a makes the monitor current data memory 36a output a value of the set monitor current Im(s) corresponding to the temperature obtained in Step S11 (Step S13). Thus, the set monitor current Im(s) is input to the comparator circuit 41a. The photodiode 12 obtains the monitor current Im(m) (Step S14). Thus, the monitor current Im(s) is input to the comparator circuit 41a. Next, the controller 32a receives a comparison result of the comparator circuit 41a and calculates the difference Δim in accordance with a following formula (7) (Step S15). By calculating the difference Δim, an error of the monitor current Im(m) from the set monitor current Im(s) can be calculated.

$$\Delta im = Im(s) - Im(m) \qquad (7)$$

Next, the controller 32a determines whether the absolute value of the difference Δim is equal to or less than a threshold (Step S16). When it is determined as "Yes" in Step S16, the bias voltage and the modulation voltage are not corrected. Thus, unnecessary correction control is suppressed.

When it is determined as "No" in Step S16, the corrected bias voltage generation circuit 40a calculates the corrected bias voltage Vb(c) so that the set monitor current Im(s) is in consistence with the monitor current Im(m) (Step S17). Thus, the bias voltage drive circuit 21a corrects the bias voltage of the modulator 13. Next, the calculation circuit 42a calculates the corrected modulation voltage Vp(c) from the coefficient OMI and the corrected bias voltage Vb(c) (Step S8). Thus, the modulation voltage drive circuit 22a corrects the modulation voltage. After that, the flowchart is terminated.

In the embodiment, it is possible to determine whether the non-linear characteristic occurs by determining whether the difference between the set monitor current Im(s) and the monitor current Im(m) at a predetermined temperature is larger than a threshold. That is, it is possible to determine whether the non-linear characteristic occurs by determining whether the difference between the target value of the optical output power and the measured value at the set bias current Ib(s) and the set modulation current Ip(s). When the bias voltage is corrected in accordance with the difference, the influence of the non-linear characteristic is suppressed. That is, a desirable extinction ratio can be achieved. Moreover, it is possible to suppress the changing of the modulation degree by performing a correcting of the modulation voltage in accordance with the corrected bias voltage. Achieving of the desirable extinction ratio is specifically effective in a multi-value modulation method such as PAM4 (Pulse Amplitude Modulation), DMT (Discrete Multi-Tone) or the like.

In the embodiment, the bias voltage drive circuit 21a acts as an a bias voltage drive circuit configured to drive a bias voltage of a modulator for modulating an output light of a light-emitting element, on a basis of an input bias voltage setting value. The modulation voltage drive circuit 22a acts as an a modulation voltage drive circuit configured to drive a modulation voltage of the modulator, on a basis of an input modulation voltage setting value. The controller 32a acts as an a determiner configured to determine whether a difference between a target value of the optical output power and the optical output power measured by the light-receiving element is equal to or more than a threshold at the bias voltage setting value and the modulation voltage setting value. The calculation circuit 42a acts as an a controller configured to perform a correction control to the bias voltage drive circuit so that the bias voltage is corrected in accordance with the difference, when it is determined that the difference is equal to or more than the threshold by the determiner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmission module comprising:
   a bias current drive circuit configured to drive a bias current of a light-emitting element, on a basis of an input bias current setting value;
   a modulation current drive circuit configured to drive a modulation current of the light-emitting element, on a basis of an input modulation current setting value;
   a light-receiving element configured to measure an optical output power of the light-emitting element;
   a determiner configured to determine whether the optical output power measured by the light-receiving element is smaller than a target value of the optical output power and a difference between the target value of the optical output power and the optical output power measured by the light-receiving element is equal to or more than a threshold at the bias current setting value and the modulation current setting value; and
   a controller configured to perform a correction control to the bias current drive circuit so that the bias current is reduced in accordance with the difference, when determining the optical output power measured by the light-receiving element is smaller than the target value of the optical output power and the difference is equal to or more than the threshold by the determiner.

2. The optical transmission module as claimed in claim 1, wherein the bias current setting value and the modulation current setting value are set in accordance with a temperature of the light-emitting element.

3. The optical transmission module as claimed in claim 1, wherein the controller performs the correction control to the modulation current drive circuit so that a fluctuation of a ratio of the bias current to the modulation current is suppressed.

4. A control method of an optical transmission module comprising:
   driving a bias current of a light-emitting element, on a basis of an input bias current setting value by a bias current drive circuit;
   driving a modulation current of the light-emitting element, on a basis of an input modulation current setting value by a modulation current drive circuit;
   measuring an optical output power of the light-emitting element by a light receiving element;
   determining whether the optical output power measured by the light-receiving element is smaller than a target value of the optical output power and a difference between the target value of the optical output power and the optical output power measured by the light-receiving element is equal to or more than a threshold at the bias current setting value and the modulation current setting value by a determiner; and
   performing a correction control so that the bias current is reduced in accordance with the difference, when determining the optical output power measured by the light-receiving element is smaller than the target value of the optical output power and the difference is equal to or more than the threshold by the determining by a controller.

5. The method as claimed in claim 4, wherein the bias current setting value and the modulation current setting value are set in accordance with a temperature of the light-emitting element.

6. The method as claimed in claim 4, wherein the modulation current is corrected so that a fluctuation of a ratio of the bias current to the modulation current is suppressed in the correction control.

* * * * *